(12) United States Patent
Miao et al.

(10) Patent No.: US 11,754,788 B2
(45) Date of Patent: Sep. 12, 2023

(54) MULTI-CHANNEL MODE CONVERTERS WITH SILICON LENSES

(71) Applicant: Huawei Technologies Co., Ltd., Shenzhen (CN)

(72) Inventors: Rongsheng Miao, San Jose, CA (US); Xueyan Zheng, Dublin, CA (US); Xiao Andy Shen, San Bruno, CA (US); Yu Sheng Bai, Los Altos Hills, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/183,828

(22) Filed: Feb. 24, 2021

(65) Prior Publication Data

US 2021/0181423 A1 Jun. 17, 2021

Related U.S. Application Data

(63) Continuation of application No. PCT/CN2019/091406, filed on Jun. 14, 2019.

(60) Provisional application No. 62/784,928, filed on Dec. 26, 2018.

(51) Int. Cl.
*G02B 6/32* (2006.01)
(52) U.S. Cl.
CPC ...................................... *G02B 6/32* (2013.01)
(58) Field of Classification Search
CPC ................................ G02B 6/32; G02B 6/3628
See application file for complete search history.

(56) References Cited

U.S. PATENT DOCUMENTS

| | | | |
|---|---|---|---|
| 6,215,924 B1 | 4/2001 | Hulse et al. | |
| 6,238,102 B1 | 5/2001 | Ohtani et al. | |
| 6,404,955 B1 | 6/2002 | Kikuchi et al. | |
| 9,250,404 B2 | 2/2016 | Lim | |
| 9,726,824 B1* | 8/2017 | Berger | G02B 6/32 |
| 9,874,699 B2 | 1/2018 | Miao et al. | |
| 2002/0131700 A1 | 9/2002 | Nakama et al. | |

(Continued)

FOREIGN PATENT DOCUMENTS

| | | |
|---|---|---|
| CN | 1518672 A | 8/2004 |
| CN | 103890625 A | 6/2014 |

(Continued)

*Primary Examiner* — Ellen E Kim
(74) *Attorney, Agent, or Firm* — Conley Rose, P.C.

(57) ABSTRACT

A multi-channel mode converter includes a lens array having a first lens and a second lens, a glass block coupled to the lens array, and a fiber assembly unit (FAU) array coupled to the glass block, the FAU array including a first fiber corresponding to the first lens, and a second fiber corresponding to the second lens. The FAU array provides for a corresponding number of fibers and lenses such that a specific single fiber corresponds to a specific single lens, there being a 1:1 relationship between fibers and lenses. A mode converter system comprises: a lens array comprising: a first silicon lens configured to convert a first mode between a first waveguide and a first fiber, and a second silicon lens configured to convert a second mode between a second waveguide and a second fiber, and a glass block coupled to the lens array and configured to provide an optical path for a first light beam corresponding to the first silicon lens and a second light beam corresponding to the second silicon lens.

20 Claims, 4 Drawing Sheets

(56) References Cited

U.S. PATENT DOCUMENTS

| | | | |
|---|---|---|---|
| 2006/0013553 A1* | 1/2006 | Imai | G02B 6/352 385/140 |
| 2006/0215269 A1* | 9/2006 | Abe | G02B 3/0012 359/619 |
| 2006/0274991 A1 | 12/2006 | Kawano et al. | |
| 2006/0280421 A1* | 12/2006 | Tanaka | G02B 26/02 385/140 |
| 2008/0013183 A1* | 1/2008 | Takeuchi | G02B 3/0043 359/626 |
| 2008/0068719 A1 | 3/2008 | Hayashi et al. | |
| 2011/0081112 A1 | 4/2011 | Nakagawa | |
| 2011/0243512 A1 | 10/2011 | Takai et al. | |
| 2013/0084039 A1 | 4/2013 | Doany et al. | |
| 2014/0169734 A1* | 6/2014 | Kachru | G02B 6/32 385/33 |
| 2016/0139339 A1 | 5/2016 | Sasaki et al. | |
| 2016/0246004 A1 | 8/2016 | Kachru et al. | |
| 2016/0252687 A1* | 9/2016 | Badihi | G02B 6/4284 385/14 |
| 2017/0205582 A1 | 7/2017 | Miao et al. | |
| 2018/0081131 A1 | 3/2018 | Heo et al. | |
| 2019/0146164 A1* | 5/2019 | Krichevsky | G02B 6/423 385/14 |

FOREIGN PATENT DOCUMENTS

| | | |
|---|---|---|
| CN | 106873094 A | 6/2017 |
| CN | 107346053 A | 11/2017 |
| CN | 108700719 A | 10/2018 |
| EP | 0657037 A1 | 6/1995 |
| JP | S6113811 B2 | 4/1986 |
| JP | H03237406 A | 10/1991 |
| JP | H0973028 A | 3/1997 |
| JP | 2001116962 A | 4/2001 |
| JP | 2002341177 A | 11/2002 |
| JP | 2004117788 A | 4/2004 |
| JP | 2005508015 A | 3/2005 |
| JP | 2006047956 A | 2/2006 |
| JP | 2010109204 A | 5/2010 |
| JP | 2016095410 A | 5/2016 |
| WO | 2015020870 F | 2/2015 |

* cited by examiner

MULTI-CHANNEL MODE CONVERTERS WITH SILICON LENSES

CROSS-REFERENCE TO RELATED APPLICATIONS

This is a continuation of International Patent App. No. PCT/CN2019/091406 filed on Jun. 14, 2019, which claims priority to U.S. Prov. Patent App. No. 62/784,928 filed on Dec. 26, 2018, both of which are incorporated by reference.

TECHNICAL FIELD

The disclosed embodiments relate to silicon photonics in general and mode converters for silicon photonics in particular.

BACKGROUND

Silicon photonic devices use silicon and its derivatives to form waveguides. In addition to the waveguides, silicon photonic devices often comprise fibers. There is a need to convert modes of the waveguides to modes of the fibers and vice versa.

A mode is a shape of a light beam at an entrance or an exit of a waveguide, a fiber, or another medium. A mode size is the physical size of a mode. The physical size may be based on optical intensity. For instance, a light beam below a specified optical intensity may not be considered part of the physical size.

SUMMARY

In an embodiment, a multi-channel mode converter includes a lens array having a first lens, a second lens, a glass block coupled to the lens array, and a fiber assembly unit (FAU) array coupled to the glass block and including a first fiber corresponding to the first lens, and a second fiber corresponding to the second lens. The lens array can be formed from a composition comprising silicon. In any of the preceding embodiments, the glass block can be formed from a composition comprising optical glass, which can be a borosilicate crown glass such as BK7. In any of the preceding embodiments, the glass block is a glass capillary block comprising a glass capillary. In any of the preceding embodiments, the lens array includes a third lens, and the FAU array includes a third fiber corresponding to the third lens. In any of the preceding embodiments, the lens array includes a fourth lens, and the FAU array includes a fourth fiber corresponding to the fourth lens. In any of the preceding embodiments, the FAU array is offset from centers of the first lens and the second lens. In any of the preceding embodiments, the lens array has a width of about 1 mm-about 5 mm, a length of about 0.5 mm-about 1 mm, and a height of about 0.5 mm-about 2 mm. In any of the preceding embodiments, the glass block has a width of about 1 mm-about 5 mm, a length of about 0.5 mm to about 2 mm, and a height of about 0.5 mm-about 2 mm. In any of the preceding embodiments, the FAU array has a width of about 1 mm-about 5 mm, a length of about 2 mm-about 5 mm, and a height of about 0.5 mm-about 2 mm.

In an embodiment, a mode converter system includes a lens array having a first silicon lens configured to convert a first mode between a first waveguide and a first fiber, and a second silicon lens configured to convert a second mode between a second waveguide and a second fiber; and a glass block coupled to the lens array and configured to provide an optical path for a first light beam corresponding to the first silicon lens and a second light beam corresponding to the second silicon lens. The mode converter system can include a waveguide block coupled to the lens array, the waveguide block having a first waveguide configured to guide the first light beam into the waveguide block, and a second waveguide configured to guide the second light beam into the waveguide block. In any of the preceding embodiments, the mode converter system further includes a fiber assembly unit (FAU) array coupled to the glass block, the FAU array including the first fiber and the second fiber. In any of the preceding embodiments, the FAU array is offset from centers of the first silicon lens and the second silicon lens. In any of the preceding embodiments, the first silicon lens and the second silicon lens have a magnification of about 1.5-about 5. In any of the preceding embodiments, the first silicon lens and the second silicon lens are configured to reduce an FAU array pitch tolerance by a ratio based on the magnification.

In an embodiment, a method is provided for manufacturing a mode converter. The method includes coupling a reflector to a lens to form a lens assembly, coupling a coupler to a fiber of a fiber assembly unit (FAU), a light source to the coupler, and a power meter to the coupler to form an FAU assembly. The lens assembly and a glass block are positioned at an end of the FAU assembly. A light beam is emitted from the light source into the coupler, and a power of a reflected light beam is obtained using the power meter, the reflected light beam is associated with the light beam; and aligning the lens assembly and the FAU assembly based on the power. In any of the preceding embodiments, the method includes aligning the lens assembly and the FAU assembly until the power is greatest at the exit end of the FAU assembly. In any of the preceding embodiments, the method further includes removing, after the aligning, at least one of the reflector, the coupler, the light source, or the power meter.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1A:
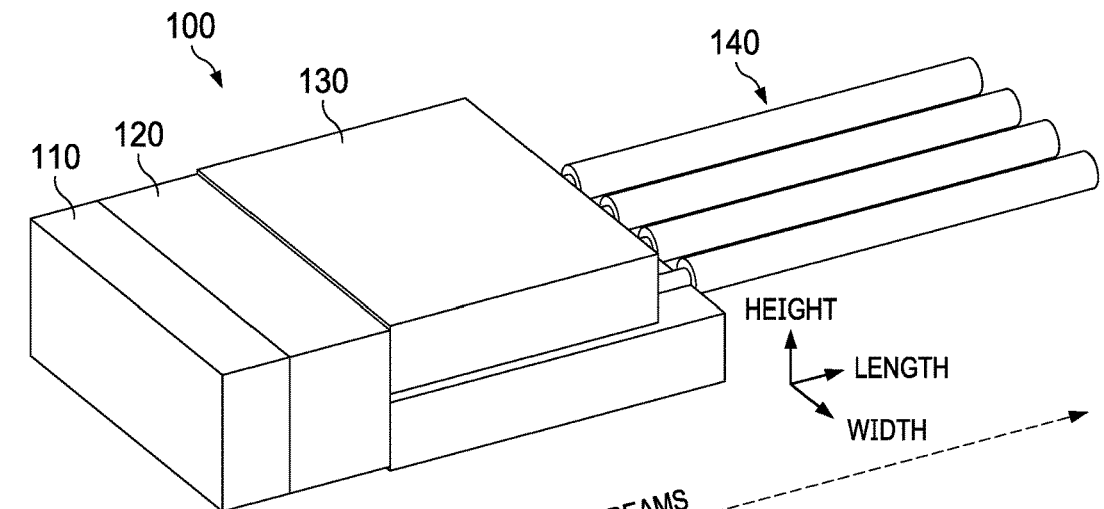
FIG. 1A is a perspective view of a schematic diagram of a multi-channel mode converter according to an embodiment of the disclosure.

It should be understood at the outset that, although illustrative implementations of embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations apply:
FAU: fiber assembly unit
LED: light-emitting diode
mm: millimeter(s)
PLC: planar lightwave circuit
PM: polarization-maintaining
SMF: single-mode fiber
SOI: silicon on insulator
μm: micrometer(s).

In silicon photonic devices, mode sizes of waveguides are typically about 2 μm-about 6 μm and mode sizes of fibers are typically about 9 μm. Due to the difference between the mode sizes, silicon photonic devices comprise mode converters, or optical mode converters, to move light beams between the waveguides and the fibers. Such mode converters may be single-channel mode converters, meaning they move light beams between one waveguide and one fiber to form one channel, or multi-channel mode converters, meaning they move light beams between more than one waveguide and more than one fiber to form multiple channels. Challenges faced in developing and deploying silicon photonic devices include the following:

A pitch tolerance is a difference between a designed pitch and an actual pitch. A pitch is a distance between centers of two adjacent light media. The light media may be waveguides or fibers. Pitch tolerances of waveguides are typically about ±0.3 μm or less because lithography processes provide for small tolerances. However, pitch tolerances of fibers are typically about ±1.0 μm. The differences in pitch tolerances between waveguides and fibers increase mode coupling losses.

Waveguides often are angled in order to reduce back reflection at their interfaces. To accommodate waveguide angling, the components comprising the fibers, which are often FAU arrays, are also angled. However, FAU angling introduces difficulties in assembling silicon photonic devices.

PLC mode converters are about 3 mm long in a direction from a waveguide to a fiber and suffer additional insertion losses from the PLC mode converter chips themselves. Furthermore, PLC mode converters suffer from coupling losses due to air gaps between the PLC mode converters and the waveguides and due to bonding of the PLC mode converters to FAUs. Moreover, to reduce the air gaps and thus the coupling loss, epoxy coupling the PLC mode converters and the waveguides is often thin, which can introduce mechanical instability.

Some mode converters couple components using passive coupling in a housing. However, the passive coupling requires high precision. In addition, the mode converters are single-channel mode converters. It is therefore desirable to provide mode converters that overcome the issues described above.

Disclosed herein are embodiments for multi-channel mode converters with silicon lenses. The mode converters include lens arrays with silicon lenses, glass blocks, FAUs, and fibers. The silicon lenses provide a reduction of an FAU pitch tolerance, which reduces a mode coupling loss. When waveguides are angled, the FAUs are offset instead of angled, which simplifies an assembly process. Mode converters with silicon lenses provide for shorter lengths, do not suffer from on-chip losses like PLC mode converters, do not suffer from air gaps and thus coupling losses like PLC mode converters, and do not suffer from thin epoxy coupling and thus mechanical instability like PLC mode converters. The mode converters may be actively aligned to ease precision requirements. Finally, the mode converters are single-channel mode converters or multi-channel mode converters.

Figure 1B:
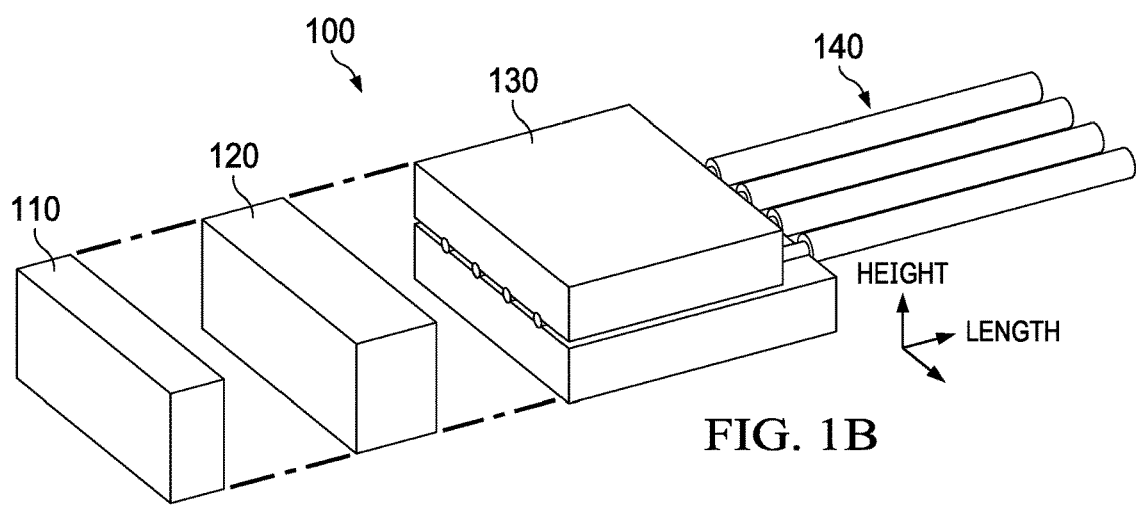
FIG. 1B is an exploded view of a schematic diagram of the multi-channel mode converter in FIG. 1A.

FIG. 1A is a perspective view of a schematic diagram of a multi-channel mode converter 100 according to an embodiment of the disclosure. FIG. 1B is an exploded view of a schematic diagram of the multi-channel mode converter 100 in FIG. 1A. The multi-channel mode converter 100 comprises a lens array 110, a glass block 120, and an FAU array 130. The FAU array 130 comprises four fibers 140.

The lens array 110 has a composition comprising silicon. The lens array 110 has a width of about 1 mm-about 5 mm, a length of about 0.5 mm-about 1 mm, and a height of about 0.5 mm-about 2 mm. The lens array 110 is dry etched to form four lenses. Like the lens array 110, the lenses have a composition comprising silicon and may therefore be referred to as silicon lenses. The lenses convert modes between a waveguide (not shown) and the fibers 140, meaning the lenses convert the mode diameter of the waveguide to the same mode diameter as the fiber and vice versa. The lenses have a magnification of about 1.5-about 5.0, for instance, 1.5-5.0×. Details concerning the lenses and waveguide are provided below.

The glass block 120 has a composition comprising optical glass. For example, the optical glass is a borosilicate crown glass such as BK7. The glass block 120 has a width of about 1 mm-5 mm, a length of about 0.5 mm-2 mm, and a height of about 0.5 mm-about 2 mm. The length is proportional to a conversion ratio, which is a ratio of the mode diameter of the fibers 140 to the mode diameter of the waveguide. The glass block 120 provides an optical path between the lens array 110 and the FAU array 130.

The FAU array 130 can be provided with a pitch of, for instance, about 127 μm, about 250 μm, or about 500 μm. As used herein, "pitch" refers to the center distance between two adjacent fibers. The FAU array 130 has a width of about 1 mm-about 5 mm, a length of about 2 mm-about 5 mm (exclusive of the fibers 140), and a height of about 0.5 mm-about 2 mm.

The fibers 140 are single-mode fibers (SMFs) or polarization-maintaining (PM) fibers. The fibers 140 include a core, an inner cladding, and an outer cladding (not shown) formed of, for example, glass. The core has a diameter of about 2-about 10 μm and, the inner cladding has a diameter of about 125 μm, and the outer cladding is a coating and has a diameter of about 0.25 mm-about 1 mm. The inner cladding protects the core, and the outside coating protects the inner cladding. A first fiber 140 corresponds to, or is paired with, a first lens; a second fiber 140 corresponds to a second lens; a third fiber 140 corresponds to a third lens; and a fourth fiber 140 corresponds to a fourth lens. The multi-channel mode converter 100 is multi-channel because it comprises more than one fiber-in this case, four fibers 140.

In operation, in a direction from the waveguide to the fibers 140, light beams exit the waveguide and enter the lenses, the lenses convert a mode of the light beams from a waveguide mode to a fiber mode, and the glass block 120 passes the light beams to the fibers 140. In a direction from the fibers 140 to the waveguide, light beams exit the fibers 140 and enter the glass block 120, the glass block 120 passes the light beams to the lenses, the lenses convert a mode of the light beams from a fiber mode to a waveguide mode, and the light beams enter the waveguide.

Alternatively, the lens array 110 comprises two, three, or more than four lenses, and the FAU array 130 comprises two, three, or more than four fibers 140. In that case, each lens corresponds to one of the fibers 140. The number of lenses and fibers 140 may affect the sizes of the components in the multi-channel mode converter 100.

The overall length of the multi-channel mode converter 100 is about 2 mm shorter than other mode converters like PLC mode converters. The reduced size of the multi-channel mode converter 100 provided through practice of the disclosed embodiments affords advantages such as a more compact configuration in high-density optoelectronic packaging applications. In addition, the multi-channel mode converter 100 does not suffer the additional insertion loss coming from the PLC mode converters chip. Furthermore, the multi-channel mode converter 100 does not suffer from air gaps and thus coupling losses like PLC mode converters. Moreover, the multi-channel mode converter 100 need not comprise a housing to couple to the components. Rather, the components may be bonded directly together. Thus, the multi-channel mode converter 100 may be said to be independent of a housing.

Figure 1C:
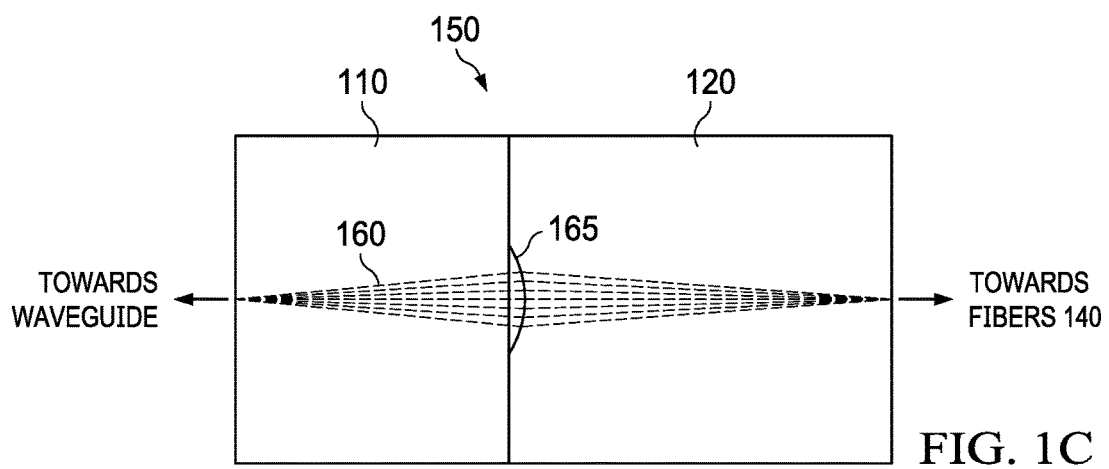
FIG. 1C is a light diagram of the multi-channel mode converter in FIGS. 1A and 1B used with a straight waveguide according to an embodiment of the disclosure.
Figure 1D:
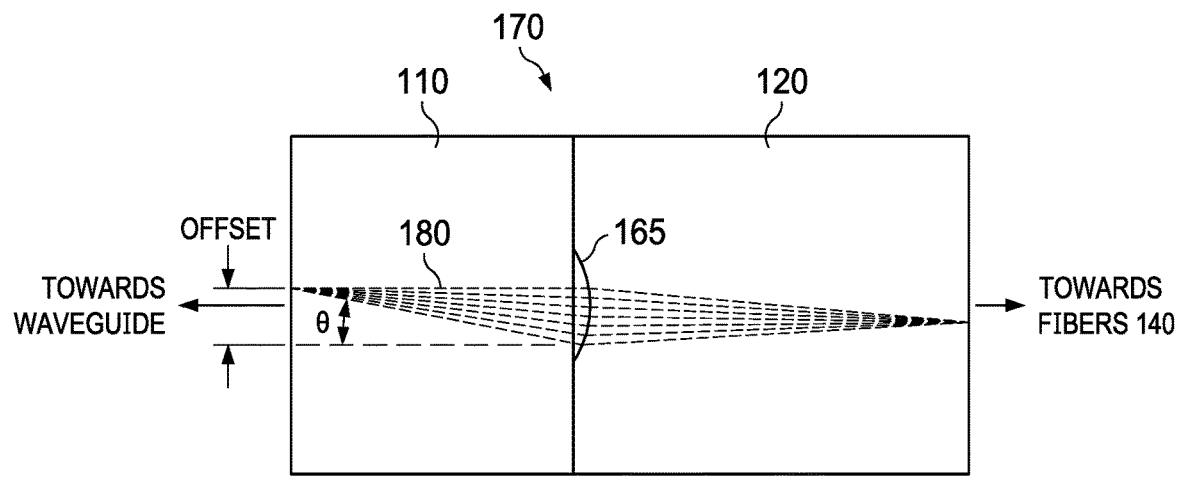
FIG. 1D is a light diagram of the multi-channel mode converter in FIGS. 1A and 1B used with an angled waveguide according to an embodiment of the disclosure.

FIG. 1C is a light diagram 150 of the multi-channel mode converter 100 in FIGS. 1A and 1B used with a straight waveguide according to an embodiment of the disclosure. The light diagram 150 shows the lens array 110 and the glass block 120 of the multi-channel mode converter 100 in FIGS. 1A and 1B. The light diagram 150 also shows a lens 165 in the lens array 110 and shows a light beam 160 traveling through the lens array 110, the lens 165, and the glass block 120. As shown, the lens 165 focuses the light beam 160 in order to convert modes between the waveguide and one of the fibers 140. The light beam 160 travels in a straight direction in and out of the waveguide, so the waveguide is a straight waveguide or a non-angled waveguide FIG. 1D is a light diagram 170 of the multi-channel mode converter 100 in FIGS. 1A and 1B used with an angled waveguide according to an embodiment of the disclosure. The light diagram 170 is similar to the light diagram 150 in FIG. 1C. Specifically, the light diagram 170 shows the lens array 110, the lens 165, the glass block 120, and a light beam 180 traveling through the lens array 110, the lens 165, and the glass block 120.

However, unlike the light diagram 150 in which the light beam 160 travels in a straight direction in and out of the waveguide, in the light diagram 170, the light beam 180 travels in an angled direction in and out of the waveguide. The angled direction is at an angle θ, which is about 2°-about 15°. As shown, the glass block 120 and thus the FAU array 130 need not be angled because the lens 165 straightens the light beam 180, or changes a direction of the light beam 180, due to an offset between where the light beam 180 enters the lens 165 and a center of the lens 165. The offset is about 5-about 50 μm depending on the angle θ.

Figure 1E:
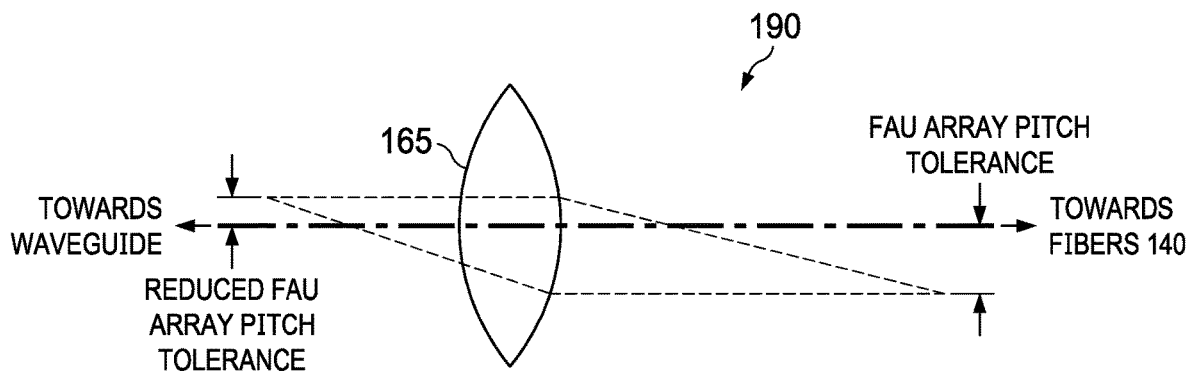
FIG. 1E is a pitch tolerance diagram of the multi-channel mode converter in FIGS. 1A and 1B according to an embodiment of the disclosure.

FIG. 1E is a pitch tolerance diagram 190 of the multi-channel mode converter 100 in FIGS. 1A and 1B. The pitch tolerance diagram 190 shows how the lens 165 provides a reduction of an FAU array pitch tolerance on a side of the FAU array 130 to a reduced FAU array pitch tolerance on a side of the waveguide. A ratio of the reduction is a ratio of the FAU array pitch tolerance to the reduced FAU array pitch tolerance. The ratio is proportional to the magnification of the lens 165. The reduction of the FAU array pitch tolerance reduces a mode coupling loss of the multi-channel mode converter 100.

As a first example, if the lens 165 has no magnification, a pitch tolerance of the waveguide is 0.3 μm, and a pitch tolerance of the FAU array 130 is 1.0 μm, then the multi-channel mode converter 100 may have a significant coupling loss. As a second example, if the lens 165 has a magnification of 3.0, then a pitch tolerance of the FAU array 130 reduces from 1.0 μm to 0.3 μm, which matches the 0.3 μm pitch tolerance of the waveguide and therefore significantly reduces a coupling loss compared to the first example. In the second example, the waveguide has a mode size of 3.0 μm and the fiber 140 has a mode size of 9.0 μm.

Figure 2:
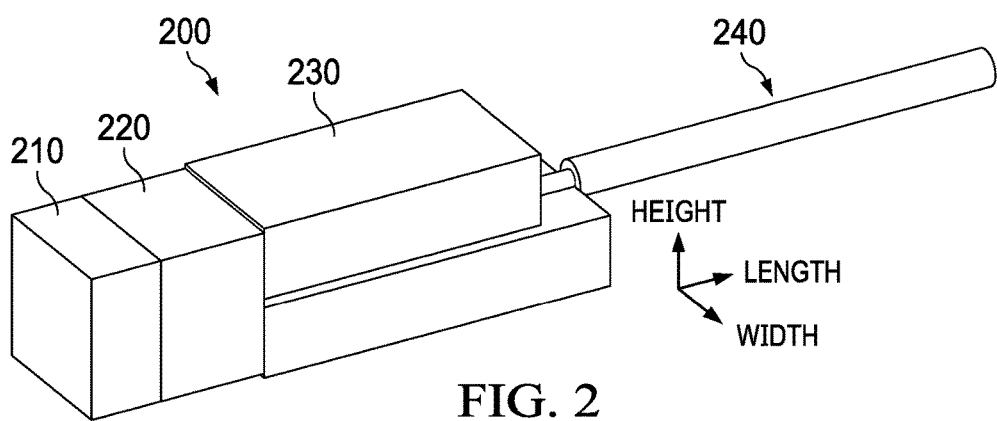
FIG. 2 is a schematic diagram of a single-channel mode converter according to an embodiment of the disclosure.

FIG. 2 is a schematic diagram of a single-channel mode converter 200 according to an embodiment of the disclosure. The single-channel mode converter 200 is similar to the multi-channel mode converter 100 in FIGS. 1A and 1B. Specifically, like the multi-channel mode converter 100, the single-channel mode converter 200 comprises a lens 210, a glass block 220, and an FAU 230.

However, unlike the lens array 110, which comprises four lenses 165, the lens 210 is a single lens. Unlike the FAU array 130, which comprises four fibers 140, the FAU 230 comprises one fiber 240. The single-channel mode converter 200 is single-channel because it comprises one fiber 240. The single-channel mode converter 200 has a width of about 1 mm-about 3 mm, a length of about 2 mm-about 5 mm when not including the fibers 240, and a height of about 1 mm-about 3 mm.

Figure 3A:
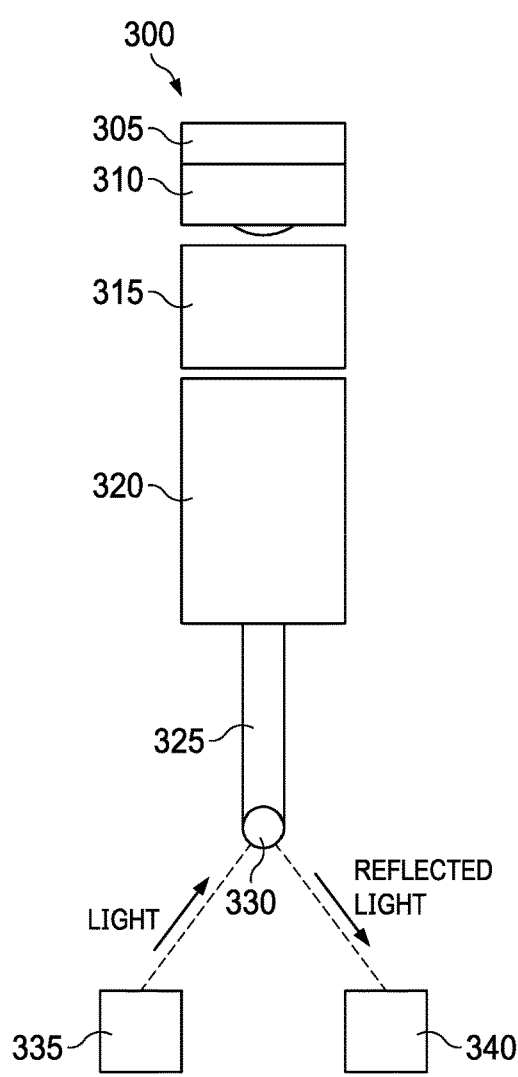
FIG. 3A is a mode converter manufacturing system according to an embodiment of the disclosure.

FIG. 3A is a mode converter manufacturing system 300 according to an embodiment of the disclosure. The mode converter manufacturing system 300 comprises a lens 310, a glass block 315, an FAU 320, and a fiber 325 similar to the lens 210, the glass block 220, the FAU 230, and the fiber 240, respectively, in the single-channel mode converter 200 in FIG. 2.

In addition, the mode converter manufacturing system 300 comprises a reflector 305, a coupler 330, a light source 335, and a power meter 340. Alternatively, the coupler 330 is a circulator. The light source 335 and the power meter 340 are coupled to the coupler 330 via fibers or other suitable media. The light source 335 is a laser, an LED, or another suitable light source.

Figure 3B:
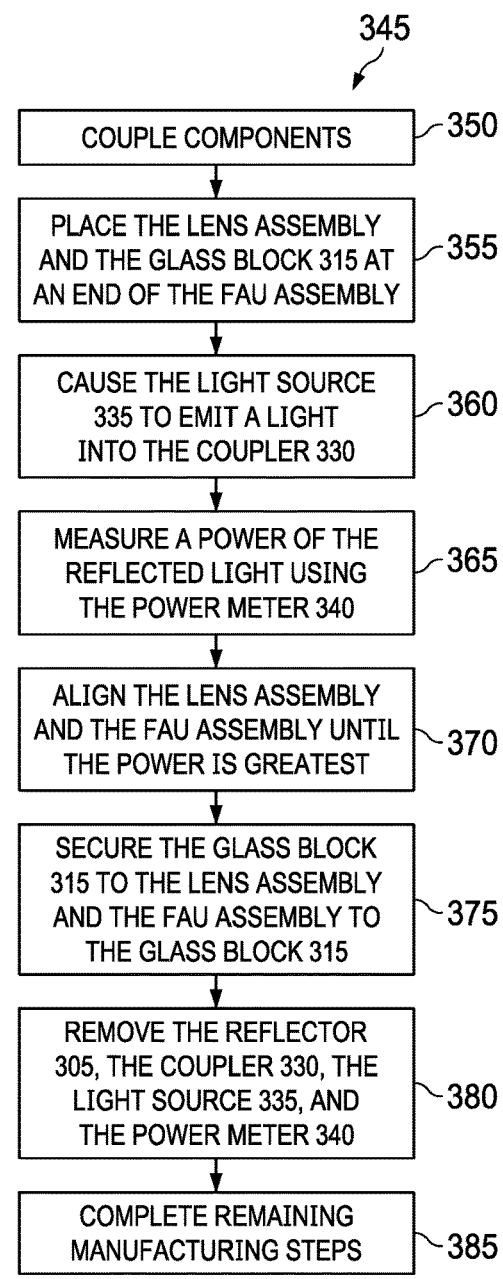
FIG. 3B is a flowchart illustrating a mode converter manufacturing method using the mode converter manufacturing system in FIG. 3A according to an embodiment of the disclosure.

FIG. 3B is a flowchart illustrating a mode converter manufacturing method 345 using the mode converter manufacturing system 300 in FIG. 3A according to an embodiment of the disclosure. A manufacturer implements the mode converter manufacturing method 345. At step 350, the manufacturer couples components. For instance, the manufacturer couples the reflector 305 to the lens 310 to form a lens assembly and couples the coupler 330 to the fiber 325, the light source 335 to the coupler 330, and the power meter 340 to the coupler 330 to form an FAU assembly.

At step 355, the lens assembly and the glass block 315 are placed at an end of the FAU assembly. For instance, the end is opposite the fiber 325. The manufacturer places the lens assembly and the glass block 315 such that light paths of the lens 310 and the glass block 315 align with a light path of the FAU 320.

At step 360, the light source 335 is caused to emit a light beam into the coupler 330. For instance, a laser is powered on and emits a continuous, highly-collimated light beam incident to the coupler 330. The light beam passes through the coupler 330, the fiber 325 in the FAU 320, the glass block 315, and the lens 310, then reflects off of the reflector 305 as a reflected light beam. The reflected light beam is therefore associated with the incident light beam. The reflected light beam passes through the lens 310, the glass block 315, the fiber 325 in the FAU 320, and the coupler 330, then enters the power meter 340.

At step 365, a power of the reflected light beam is measured using the power meter 340. At step 370, the manufacturer aligns the lens assembly and the FAU assembly until the power is greatest or aligns the lens assembly and the FAU assembly to achieve a maximum measured power. The power is greatest when light paths of the lens 310 and the FAU 320 align. When the lens 310 is a lens array comprising multiple lenses like the lens array 110 in FIGS. 1A and 1B, the manufacturer need align only the two lenses on the ends of the lens 310. The process of measuring the power and aligning the components based on that measuring is referred to as "active alignment".

At step 375, the glass block 315 is secured to the lens assembly and the FAU assembly to the glass block 315. The manufacturer does so using an optical epoxy or another suitable bonding material. Alternatively, the manufacturer does so using another suitable bonding method.

At step 380, the reflector 305, the coupler 330, the light source 335, and the power meter 340 are removed. Finally, at step 385, the manufacturer completes remaining manufacturing steps. Those steps may include testing the components. Although the mode converter manufacturing method 345 uses the mode converter manufacturing system 300, which comprises a single channel, the same principles apply to a mode converter manufacturing system comprising multiple channels.

Figure 4:
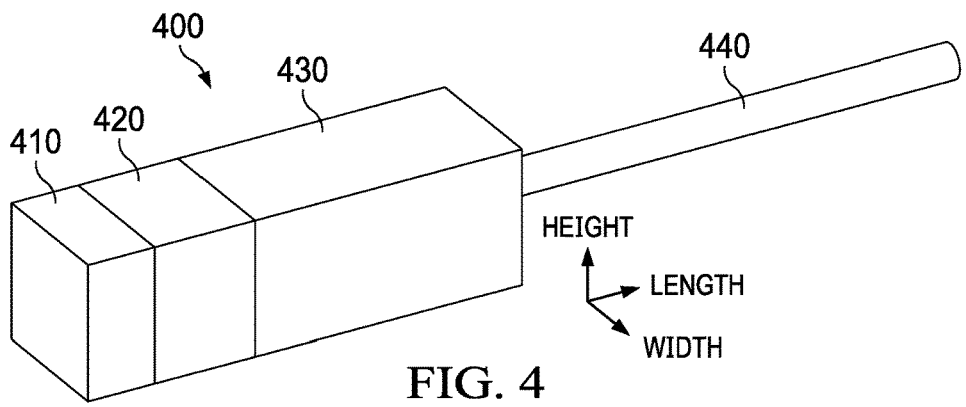
FIG. 4 is a schematic diagram of a single-channel mode converter according to another embodiment of the disclosure.

FIG. 4 is a schematic diagram of a single-channel mode converter 400 according to another embodiment of the disclosure. The single-channel mode converter 400 is similar to the single-channel mode converter 200 in FIG. 2. Specifically, like the single-channel mode converter 200, the single-channel mode converter 400 comprises a lens 410, a glass block 420, and a fiber 440.

However, instead of the FAU 230 in the single-channel mode converter 200, the single-channel mode converter 400 comprises a glass capillary block 430. The glass capillary block 430 has a composition comprising glass. The glass capillary block 430 has a width of about 1 mm-about 3 mm, a length of about 2 mm-about 5 mm, and a height of about 1 mm-about 3 mm. The glass capillary block 430 comprises a glass capillary that runs along the length of the glass capillary block 430. The diameter of the glass capillary is the same as the diameter of the fiber 440 so that the fiber 440 may be plugged into the glass capillary block 430. The glass capillary block 430 provides a cost-effective alternative to the FAU 230.

Figure 5:
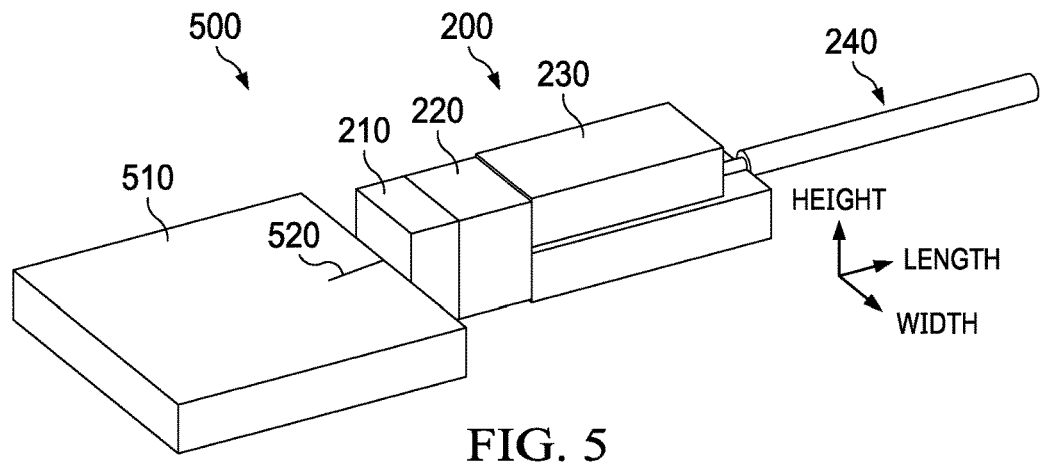
FIG. 5 is a schematic diagram of a single-channel mode converter system according to an embodiment of the disclosure.

FIG. 5 is a schematic diagram of a single-channel mode converter system 500 according to an embodiment of the disclosure. The single-channel mode converter system 500 comprises the single-channel mode converter 200. Alternatively, the single-channel mode converter system 500 comprises the single-channel mode converter 400. The single-channel mode converter system 500 further comprises a waveguide block 510.

The waveguide block 510 has a composition comprising silicon and may be referred to as silicon on insulator (SOI) block. The waveguide block 510 is transparent to show that it comprises a waveguide 520. The waveguide 520 guides a light beam into the waveguide block 510.

A manufacturer aligns the waveguide 520 and the single-channel mode converter 200. The manufacturer then bonds the waveguide block 510 and the single-channel mode converter 200 using an optical epoxy, or another suitable bonding material. The bonding material should fill a gap between the waveguide block 510 and the single-channel mode converter 200. The gap is about 10 μm-30 μm, which provides improved mechanical bonding strength and thus reliability.

Figure 6:
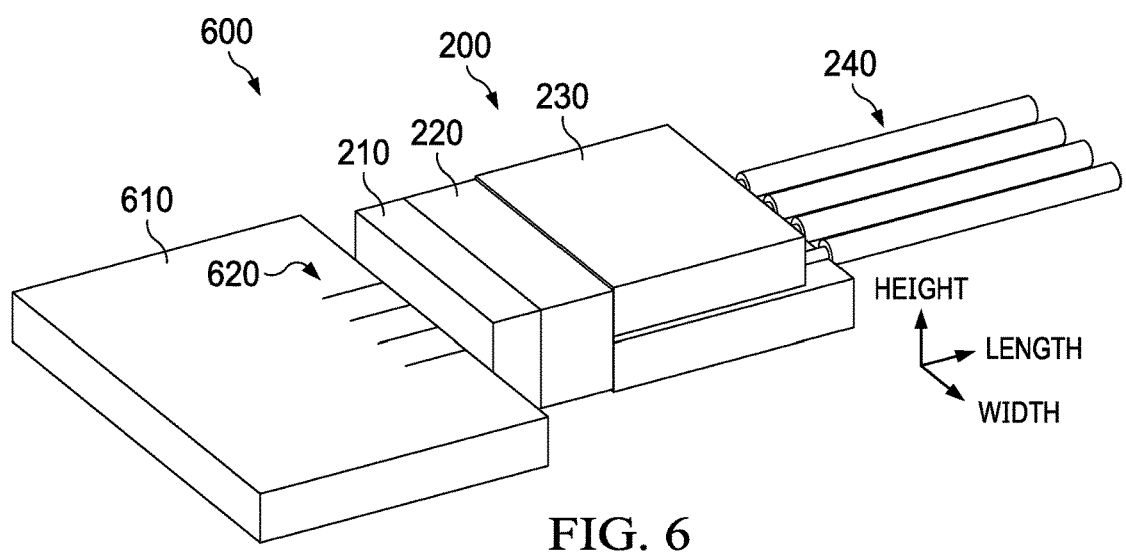
FIG. 6 is a schematic diagram of a multi-channel mode converter system according to an embodiment of the disclosure.

FIG. 6 is a schematic diagram of a multi-channel mode converter system 600 according to an embodiment of the disclosure. The multi-channel mode converter system 600 is similar to the single-channel mode converter system 500 in FIG. 5. Specifically, like the single-channel mode converter system 500, the multi-channel mode converter system 600 comprises a waveguide block 610.

However, unlike the waveguide block 510, which comprises a single waveguide 520, the waveguide block 610 comprises four waveguides 620. A manufacturer need align only the two waveguides 620 on the ends of the waveguide block 610. Alternatively, the waveguide block 610 comprises two, three, or more than four waveguides 620. Unlike the single-channel mode converter system 500, which comprises the single-channel mode converter 200, the mode converter system 600 comprises the multi-channel mode converter 100.

Figure 7:
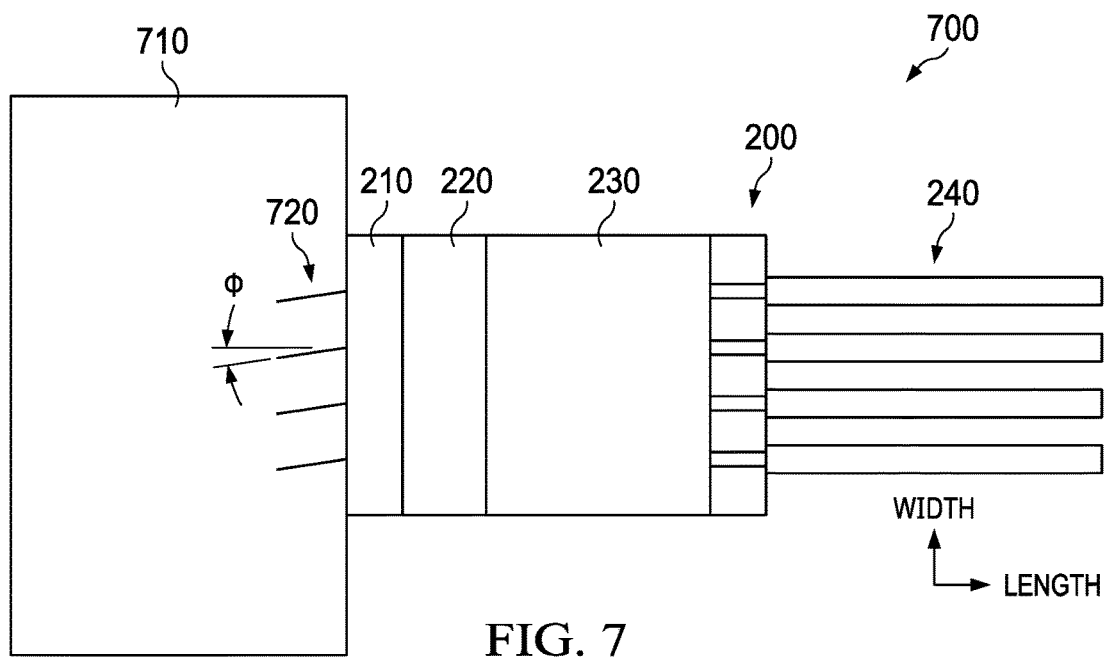
FIG. 7 is a schematic diagram of a multi-channel mode converter system according to another embodiment of the disclosure.

FIG. 7 is a schematic diagram of a multi-channel mode converter system 700 according to another embodiment of the disclosure. The multi-channel mode converter system 700 is similar to the multi-channel mode converter system 600 in FIG. 6. Specifically, like the multi-channel mode converter system 600, the multi-channel mode converter system 700 comprises a waveguide block 710 and the mode converter 100. In addition, like the waveguide block 610, which comprises the waveguides 620, the waveguide block 710 comprises waveguides 720.

However, unlike the waveguides 620, which are straight with respect to a length of the waveguide block 610, the waveguides 720 are angled with respect to a length of the waveguide block 710. The waveguides 720 are angled at an angle $\phi$, which is about 2°-15°. The angling of the waveguides 720 reduces or eliminates back reflection of light beams at an interface between the waveguide block 710 and the lens array 110. To match the angling of the waveguides 720, the FAU 130 is offset from centers of lenses in the lens array 110 to produce angled light beams in a manner similar to that shown in FIG. 1D. The offset obviates the need to angle the FAU 130 in the same direction as the waveguides 720, which simplifies an assembly process.

A multi-channel mode converter comprises: a lens array element comprising: a first lens element, and a second lens element; a glass block element coupled to the lens array element; and an FAU array element coupled to the glass block element and comprising: a first fiber element corresponding to the first lens element, and a second fiber element corresponding to the second lens element.

The term "about" means a range including ±10% of the subsequent number unless otherwise stated. While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A multi-channel mode converter comprising:
    a lens array formed from a composition comprising silicon, the lens array comprising:
        a first lens etched from the lens array and being formed from a composition comprising silicon, and
        a second lens etched from the lens array and being formed from a composition comprising silicon;
    a glass block bonded to the lens array, wherein widths of the lens array and the glass block are substantially the same, and wherein heights of the lens array and the glass block are substantially the same; and
    a fiber assembly unit (FAU) array coupled to the glass block and comprising:
        a first fiber coupled to the first lens through the glass block and configured to carry a first optical signal between the first fiber and the first lens, and
        a second fiber coupled to the second lens through the glass block and configured to carry a second optical signal between the second fiber and the second lens, wherein the first lens and the second lens have magnifications configured to match a pitch tolerance of the FAU array to a waveguide pitch tolerance.

2. The multi-channel mode converter of claim 1, wherein the glass block has a composition comprising optical glass.

3. The multi-channel mode converter of claim 2, wherein the optical glass is BK7.

4. The multi-channel mode converter of claim 1, wherein the glass block is a glass capillary block comprising a glass capillary.

5. The multi-channel mode converter of claim 1, wherein a number of lenses included in the lens array and a number of fibers included in the FAU array are equal.

6. The multi-channel mode converter of claim 1, wherein the FAU array is offset from centers of the first lens and the second lens.

7. The multi-channel mode converter of claim 1, wherein the lens array has a width of about 1 millimeters (mm)-about 5 mm, a length of about 0.5 mm-about 1 mm, and a height of about 0.5 mm-about 2 mm.

8. The multi-channel mode converter of claim 7, wherein the glass block has a width of about 1 mm-about 5 mm, a length of about 0.5 mm-about 2 mm, and a height of about 0.5 mm-about 2 mm.

9. The multi-channel mode converter of claim 8, wherein the FAU array has a width of about 1 mm-about 5 mm, a length of about 2 mm-about 5 mm, and a height of about 0.5 mm-about 2 mm.

10. A mode converter system comprising:
    a waveguide block comprising:
        a first waveguide configured to guide a first light beam into the waveguide block in an angled direction at an angle of about 2°-15°; and
        a second waveguide configured to guide a second light beam into the waveguide block in the angled direction;
    a lens array coupled to the waveguide block and comprising:
        a first silicon lens corresponding to the first light beam and configured to convert a first mode between the first waveguide and a first fiber, and
        a second silicon lens corresponding to the second light beam and configured to convert a second mode between the second waveguide and a second fiber, wherein the first silicon lens and the second silicon lens are configured to reduce a fiber assembly unit (FAU) array pitch tolerance by a ratio based on magnification; and
    a glass block coupled to the lens array and configured to provide an optical path for the first light beam and the second light beam.

11. The mode converter system of claim 10, further comprising a fiber assembly unit (FAU) array coupled to the glass block and comprising the first fiber and the second fiber.

12. The mode converter system of claim 11, wherein the FAU array is offset from centers of the first silicon lens and the second silicon lens.

13. The mode converter system of claim 10, wherein the first silicon lens and the second silicon lens have a magnification of about 1.5-about 5.

14. A method of manufacturing a mode converter, the method comprising:
    coupling a reflector to a lens to form a lens assembly;
    coupling a coupler to a fiber of a fiber assembly unit (FAU), a light source to the coupler, and a power meter to the coupler to form an FAU assembly;
    placing the lens assembly and a glass block at an end of the FAU assembly so that the glass block is positioned between the lens assembly and the FAU assembly;
    directing a light beam from the light source into the coupler to cause the light beam to sequentially travel through the coupler, the fiber, the FAU, the glass block, and the lens in a first direction in order to reflect off of the reflector as a reflected light beam that sequentially travels through the lens, the glass block, the FAU, the fiber, and the coupler in a second direction that is substantially opposite the first direction;
    measuring a power of the reflected light beam using the power meter, the reflected light beam is associated with the light beam; and
    aligning the lens assembly and the FAU assembly based on the power to achieve a maximum measured power.

15. The method of claim 14, further comprising removing, after the aligning, at least one of the reflector, the light source, or the power meter.

16. The method of claim 14, further comprising removing the coupler after the aligning.

17. The multi-channel mode converter of claim 1, wherein the FAU array is bonded to the glass block using an optical epoxy or using another bonding material.

18. The multi-channel mode converter of claim 1, wherein the first fiber is further configured to further carry the first optical signal from the first fiber, through the first lens, and towards a first waveguide in a first substantially straight manner, and wherein the second fiber is further configured to further carry the second optical signal from the second fiber, through the second lens, and towards a second waveguide in a second substantially straight manner.

19. The mode converter system of claim 10, wherein the first silicon lens and the second silicon lens have magnifications configured to match the FAU array pitch tolerance to a waveguide pitch tolerance.

20. The mode converter system of claim 10, wherein widths of the lens array and the glass block are substantially the same, and wherein heights of the lens array and the glass block are substantially the same.

\* \* \* \* \*